United States Patent [19]
Berringer et al.

[11] Patent Number: 6,139,101
[45] Date of Patent: Oct. 31, 2000

[54] ADJUSTABLE BASE CONVERTIBLE CHILD CAR SEAT

[75] Inventors: Ronald B. Berringer, Aurora; Gary R. Lemmeyer, Hudson; Phillip M. Novak, Bedford, all of Ohio

[73] Assignee: Graco Children's Product Inc., Elverson, Pa.

[21] Appl. No.: 09/177,955

[22] Filed: Oct. 23, 1998

[51] Int. Cl.$^7$ .................................................. A47C 1/08
[52] U.S. Cl. ................................. 297/256.1; 297/256.13; 297/256.16
[58] Field of Search .......................... 297/250.1, 256.1, 297/256.13, 256.14, 256.16

[56] References Cited

U.S. PATENT DOCUMENTS

| | | | |
|---|---|---|---|
| 4,047,755 | 9/1977 | McDonald et al. | 297/216 |
| 4,632,456 | 12/1986 | Kassai | 297/328 |
| 4,688,850 | 8/1987 | Brownlie et al. | 297/270 |
| 4,729,600 | 3/1988 | Single, II et al. | 297/256.13 |
| 4,733,909 | 3/1988 | Single, II et al. | 297/250 |
| 4,754,999 | 7/1988 | Kain | 297/250 |
| 4,909,574 | 3/1990 | Sedlack | 297/488 |
| 4,943,113 | 7/1990 | Meeker | 297/250 |
| 4,976,494 | 12/1990 | Polley | 297/464 |
| 5,052,749 | 10/1991 | Groenendijk | 297/250 |
| 5,052,750 | 10/1991 | Takahashi et al. | 297/250 |
| 5,058,283 | 10/1991 | Wise et al. | 33/371 |
| 5,110,182 | 5/1992 | Beauvais | 297/216 |
| 5,181,761 | 1/1993 | Meeker | 297/250 |
| 5,277,472 | 1/1994 | Freese et al. | 297/130 |
| 5,335,964 | 8/1994 | Sedlack et al. | 297/256.13 |
| 5,378,038 | 1/1995 | Koyanagi et al. | 297/256.13 |
| 5,380,062 | 1/1995 | Nania | 297/256.13 |
| 5,427,432 | 6/1995 | Meeker et al. | 297/256.15 |
| 5,478,135 | 12/1995 | Kain | 297/256.16 |
| 5,494,331 | 2/1996 | Onishi et al. | 297/256.13 |
| 5,507,558 | 4/1996 | Kain | 297/256.15 |
| 5,551,751 | 9/1996 | Sedlack et al. | 297/256.13 |
| 5,581,234 | 12/1996 | Emery et al. | 340/457.1 |
| 5,599,063 | 2/1997 | Lister et al. | 297/325 |
| 5,607,203 | 3/1997 | Sedlack | 297/256.15 |
| 5,609,393 | 3/1997 | Meeker et al. | 297/256.13 |
| 5,695,243 | 12/1997 | Anthony et al. | 297/250.1 |
| 5,722,719 | 3/1998 | Glomstad | 297/216.11 |
| 5,746,478 | 5/1998 | Lumley et al. | 297/256.13 |
| 5,836,649 | 11/1998 | Bonetti | 297/256.13 X |
| 5,836,650 | 11/1998 | Warner, Jr. et al. | 297/256.11 |
| 5,890,762 | 4/1999 | Yoshida | 297/256.13 |
| 5,997,086 | 12/1999 | Gibson et al. | 297/256.16 |
| 6,017,088 | 1/2000 | Stephens et al. | 297/256.16 |

*Primary Examiner*—Laurie K. Cranmer
*Attorney, Agent, or Firm*—Foley & Lardner

[57] ABSTRACT

An adjustable child car seat (100) includes a base (110) with a pivot rod (174) at one end and a level adjuster receptor (140) with a plurality of adjust positions (150) at an opposite end. A recliner (114) is carried by the base (110) at the pivot rod (174). The recliner (114) provides a level adjuster (250) that is selectively moveable into any one of the adjust positions (150). The recliner also provides a seat recline level adjuster receptor (220) with a plurality of recline positions (224). A car seat (102) is pivotably mounted to the recliner (114) by a seat pin (126). A seat recline adjuster (300) is slidably mounted to the car seat and is selectively moveable into one of the recline positions. Accordingly, the level adjuster (250) allows positioning of the base (110) to the angle of the supporting seat. Further adjustment is permitted by moving the seat with respect to the recliner.

14 Claims, 12 Drawing Sheets

ADJUSTABLE BASE CONVERTIBLE CHILD CAR SEAT

TECHNICAL FIELD

This invention relates to an adjustable base convertible child car seat. More particularly, this invention relates to a car seat which is adjustable to accommodate the slope of the automobile seat which supports the child car seat. Specifically, this invention relates to a child car seat which has a second, separate adjustable recline feature for the comfort of the child.

BACKGROUND ART

Child or infant car seats are especially designed to carry an infant or toddler in a vehicle. Child car seats serve two primary purposes. First, the child car seat retrains and prevents injury to the child in the event of an accident. Secondly, the child car seat holds the child in a comfortable manner so that the child does not move about the car while it is being driven.

Car seats are secured to a rear automobile seat by either a lap or lap/shoulder seat belt. Typically, infants that weigh up to 22 pounds are placed in a rear-facing position. Toddlers that weigh from between about 20 to 40 pounds are placed in a forward-facing position. A rear-facing position is employed for infants so as to better support their head and neck during transport and in a crash.

It is known to provide a single rear facing recline adjustment in child car seats to enhance the safety and comfort of the child. Unfortunately, these known seats are unable to accommodate varying slopes of the supporting automobile seat on which it is placed. As such, even if the child's car seat is adjustable, it may not provide the necessary adjustment to allow for support of the child's head and neck. Proper recline is important for very young infants who lack the muscular strength to hold their head up or to address the potential of positional apnea.

Thus, the need exists for a child car seat which accommodates the incline of the supporting automobile seat and which also allows for recline adjustment of the car seat with respect to its base.

DISCLOSURE OF THE INVENTION

It is thus an object of the present invention to provide an adjustable base convertible child car seat.

It is another object of the present invention to provide a child car seat which may be used in either a forward or rear facing position.

It is still another object of the present invention to provide a child car seat, as above, in which a seat recline adjuster is provided to adjust the recline of the car seat to a more reclined position for rear facing use with an infant.

It is yet another object of the present invention to provide a child car seat, as above, in which a level adjuster is provided to maintain the proper recline while accommodating the incline of the supporting seat structure.

It is a further object of the present invention to provide a child car seat, as above, in which an adjustable base pivotably receives a recliner.

It is yet a further object of the present invention to provide a child car seat, as above, in which the adjustable base has a level adjuster receptor in the form of a multi-fingered cavity to receive a spring-biased level adjuster.

It is still a further object of the present invention to provide a child car seat, as above, in which the car seat is pivotably mounted to the recliner.

It is an additional object of the present invention to provide a child car seat, as above, in which the recliner has a seat recline adjustor receptor with a plurality of recline adjustment openings.

It is yet an additional object of the present invention to provide a child car seat, as above, in which a seat recline adjuster is slidably mounted to a seat bottom of the car seat, wherein the seat recline adjuster has wings received in the recline adjustment openings to allow positional adjustment of the seat.

These and other objects of the present invention, as well as the advantages thereof over existing prior art forms, which will become apparent from the description to follow, are accomplished by the improvements hereinafter described and claimed.

In general, an adjustable child car seat made in accordance with the present invention includes a base, a recliner, a level adjuster, a car seat, and a seat recline adjuster. The base has opposed sides connected by a front cross bar at one end and a rear cross bar at an opposite end. The opposed sides have a pair of side holes aligned with one another proximal the rear cross bar and each of the sides has a level adjuster receptor facing one another proximal the front cross bar. The level adjuster receptor has a plurality of adjust openings that allow pivotable movement of the car seat with respect to the base and supporting automobile seat. A recliner has a bottom with opposed side walls which are slidably adjacent and disposed between the opposed sides of the base. The bottom has a pivot hole therethrough aligned with the side holes of the base to receive a pivot rod such that the recliner is pivotable about the pivot rod. The recliner has a seat pivot module substantially medially disposed between the side walls wherein the seat pivot module has a hinge hole proximal the pivot rod. A seat recline level adjuster receptor is provided by the seat pivot module with a plurality of recline adjustment openings distal the pivot rod. The recliner has pivot surfaces adjacent the seat pivot module. The bottom of the recliner further has a rim extending between the opposed side walls and a recliner slot therethrough. A level adjuster is secured to the rim and carries a spring-biased adjuster pin which is moveable within the recliner slot and selectively moveable between the plurality of adjust openings. A child car seat has a pair of pivot ribs that are slidably moveable on the respective pivot surfaces. The pivot ribs have aligned pivot holes therethrough that are alignable with the hinge hole wherein the pivot holes and the hinge hole receive a seat pin to allow the car seat to pivotably move with respect to the retainer. A seat recline adjuster is biasingly mounted to an underside of the car seat and has at least one projection that is selectively moveable between the plurality of adjustment openings to allow pivotable adjustment of the car seat with respect to the recliner and wherein the recliner is adjustable within the base.

A preferred adjustable base convertible child car seat incorporating the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
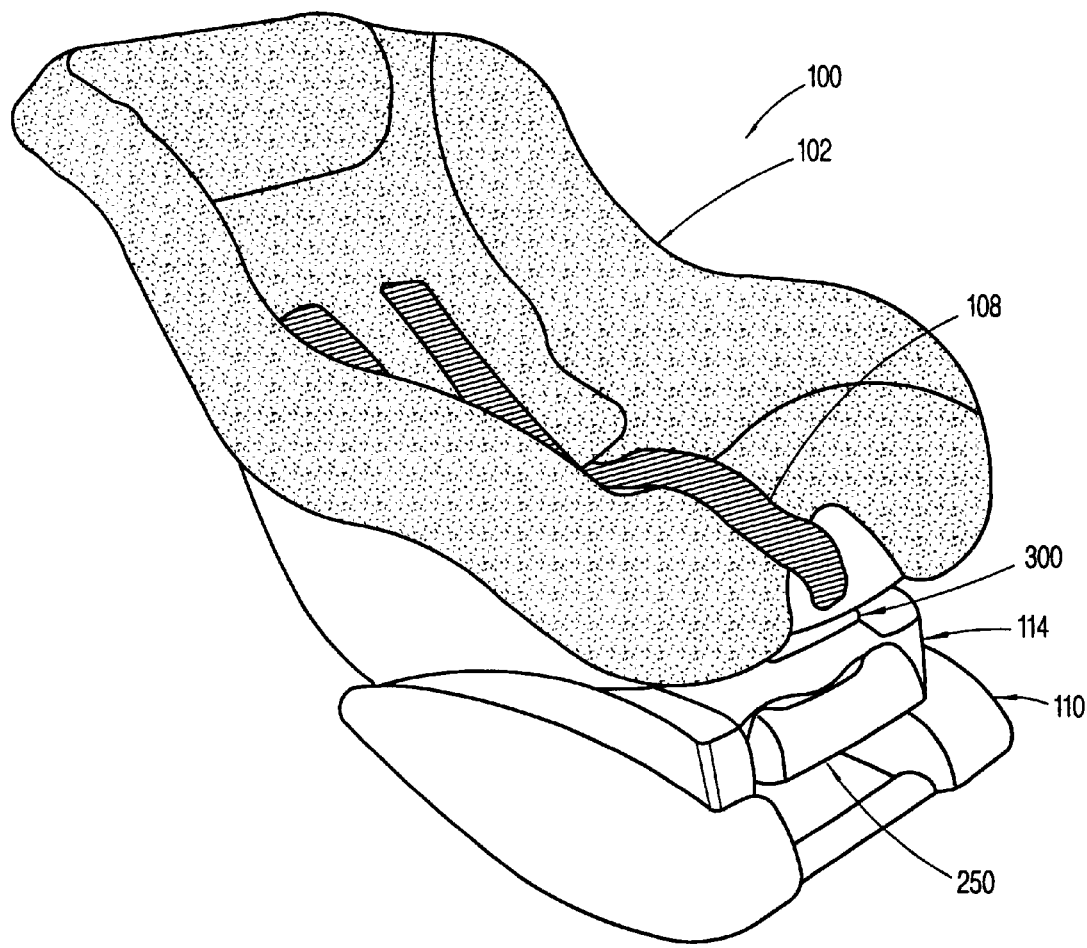
FIG. 1 is a perspective view of an adjustable base convertible child car seat according to the present invention.
Figure 2:
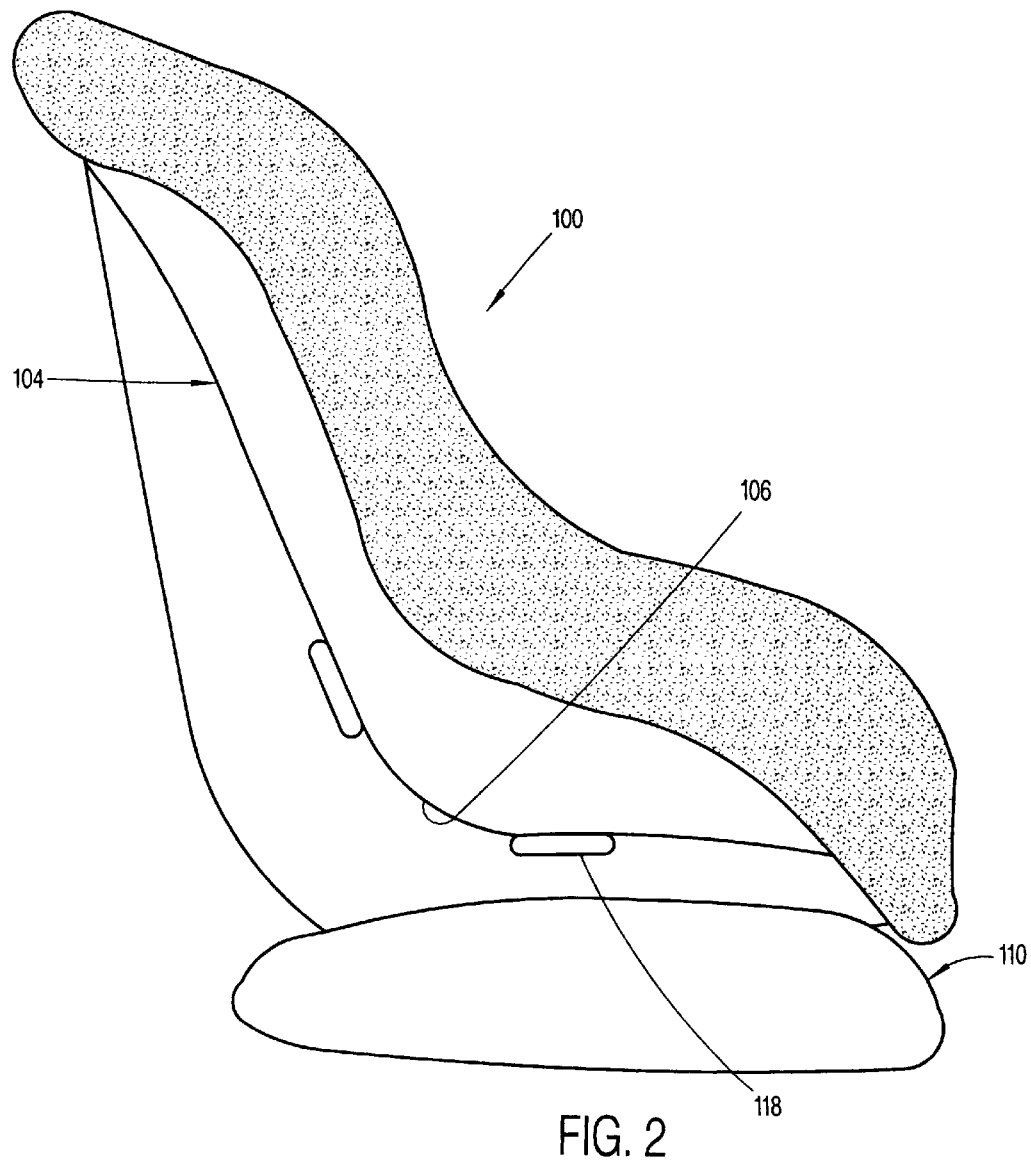
FIG. 2 is a side elevational view showing the child car se at in an upright position.
Figure 3:
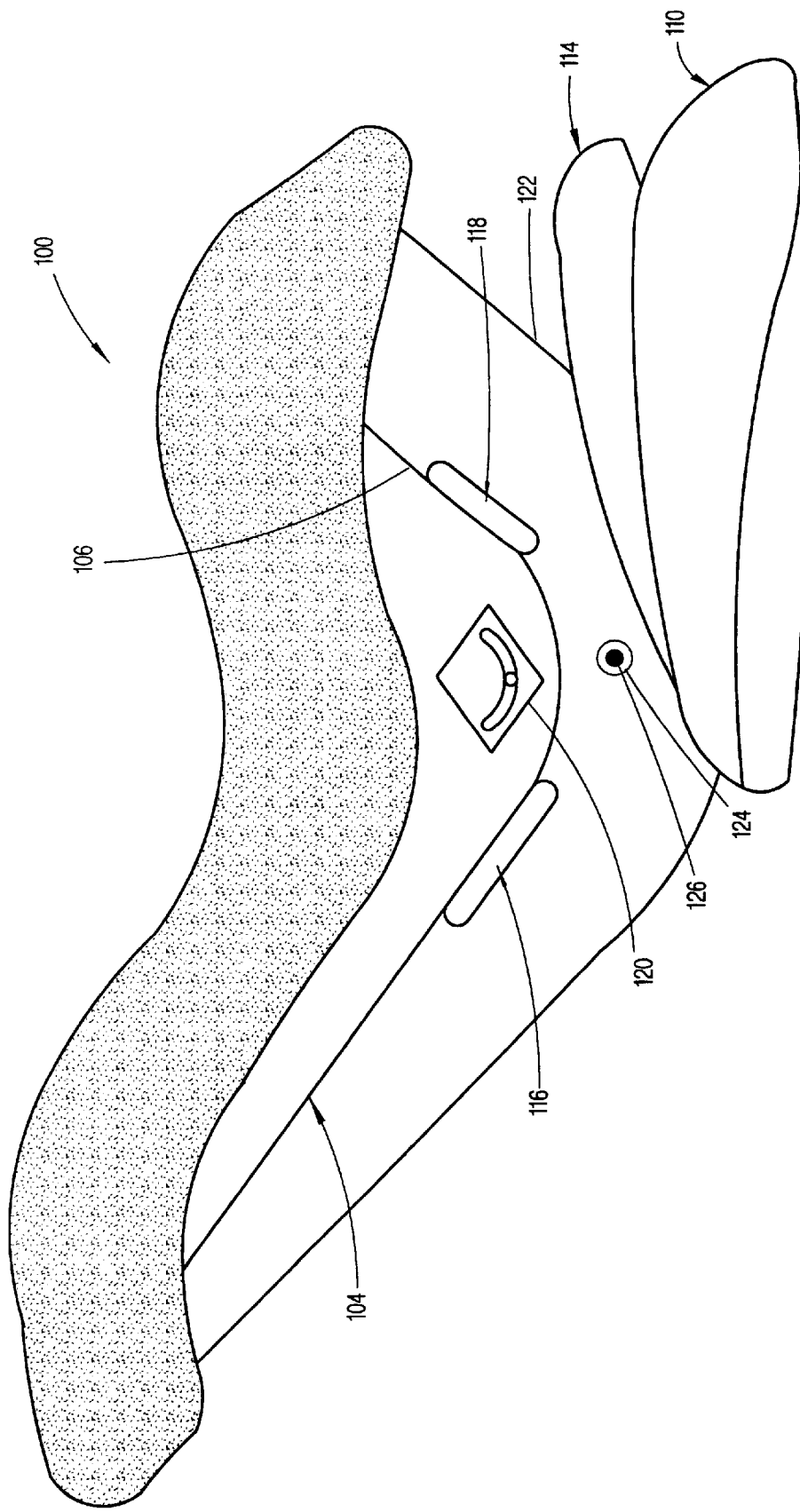
FIG. 3 is a side elevational view showing the child car seat in one of the rear facing reclined positions.

An adjustable base convertible car seat in accordance with the concepts of the present invention is indicated generally the numeral 100 in the accompanying drawings and is best seen generally in FIGS. 1–3. The primary components of the adjustable child car seat include a child seat 102 which has a back support 104 and a seat support 106. A safety strap 108 is provided to secure an infant or toddler into child car seat 102. Child car seat 100 includes an adjustable base 110 which adjusts the position of child car seat 102 with respect to a supporting surface, such as an automobile seat. A recliner 114 is provided to allow adjustment of child seat 102 with respect to adjustable base 110.

Generally, adjustable base 110 has four adjustment positions to accommodate vehicle seats with varying degrees of surface slope. The angle of the seating surface of the vehicle seat bottom can vary from about an 8 degree slope to a slope of about 22 degrees. Adjustable base 110 provides adjustment to accommodate the seating surface angle and allows seat back support 104 to be adjusted to the proper recline position independent of the seating surface angle. This is very important for very young infants who lack the muscular strength to hold their head up. As will be discussed hereinbelow, car seat 100 is adjustable to 12 different positions, although more or less positions could be provided utilizing the concepts of the invention disclosed herewith.

As best seen in FIG. 2, child car seat 100 may be provided in an upright position. The position of the car seat relative to the vehicle surface seat may be adjusted as seen in FIG. 3. Child car seat 102 includes a seat belt slot 116 for receiving a vehicle seat belt when car seat 100 is placed in a forward-facing position. This position is used for toddlers weighing from about 20 pounds to about 40 pounds. Child seat 102 also provides a seat belt slot 118 for when the child seat is placed in a rearward-facing position. This position is typically used rear facing for infants up to 22 pounds so that they receive the proper support for their head and neck. A level indicator 120 may be provided on the child seat 102 to define the optimum recline angle for rear facing. Level indicator 120 is described in U.S. Pat. No. 5,058,283, and is incorporated herein by reference.

Figure 4:
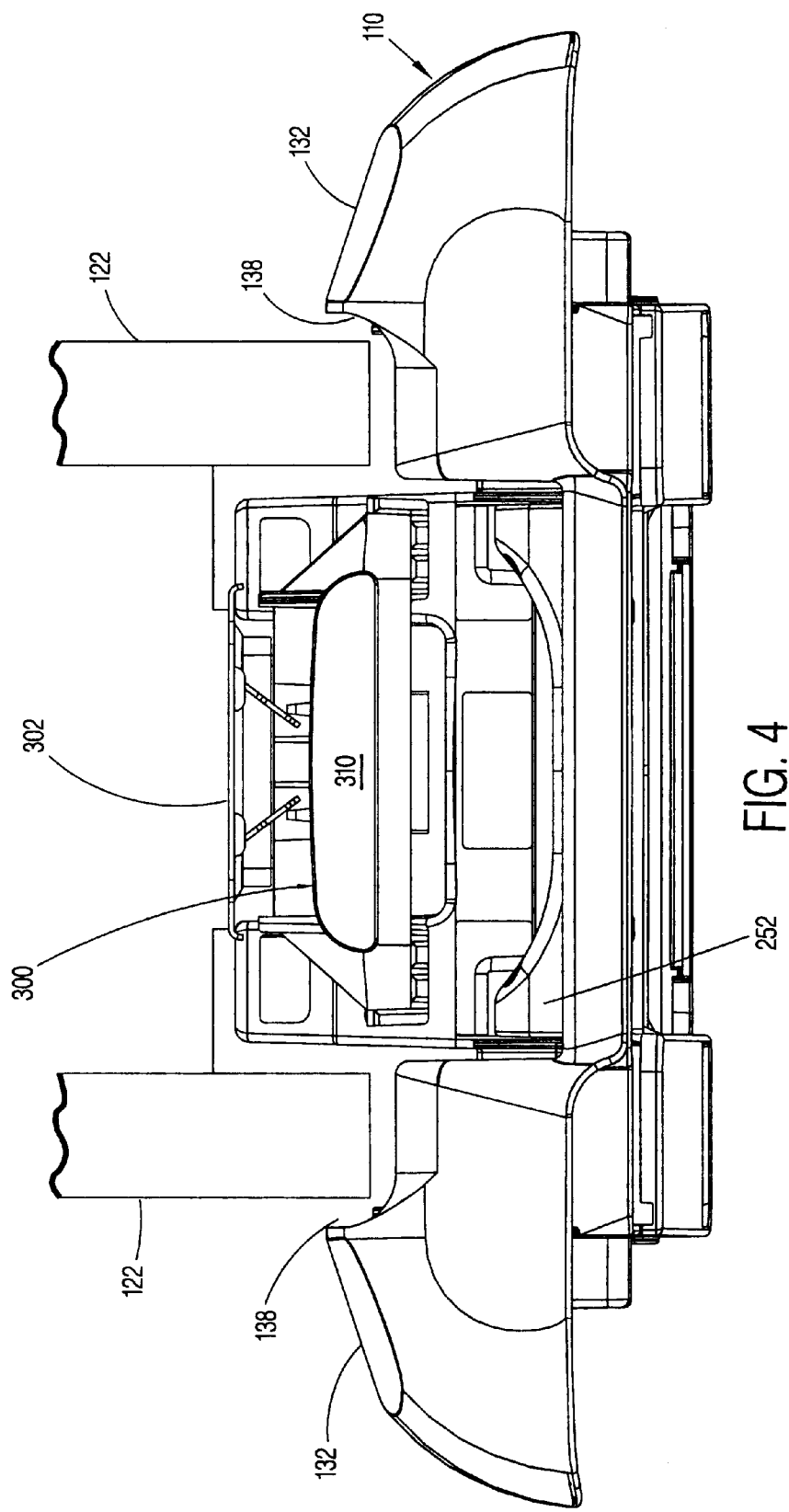
FIG. 4 is a partial front elevational view of the child car seat.

Child seat 102, as best seen in FIGS. 3 and 4, provides a pair of pivot ribs 122 which allow car seat 102 to pivot on recliner 114. A pivot hole 124 is provided through pivot ribs 122 and receives a seat pin 126. Accordingly, child seat 102 is pivotable about seat pin 126, wherein the seat pin is also directed through recliner 114.

Adjustable base 110, as best seen in FIGS. 4, 5, 7, and 8 includes a frame 130 which has opposed sides 132. One end of each side 132 is connected by a front cross bar 134 and supported by a buttress 136 at each end of cross bar 134. Each side 132 provides an interior wall 138.

Figure 7:
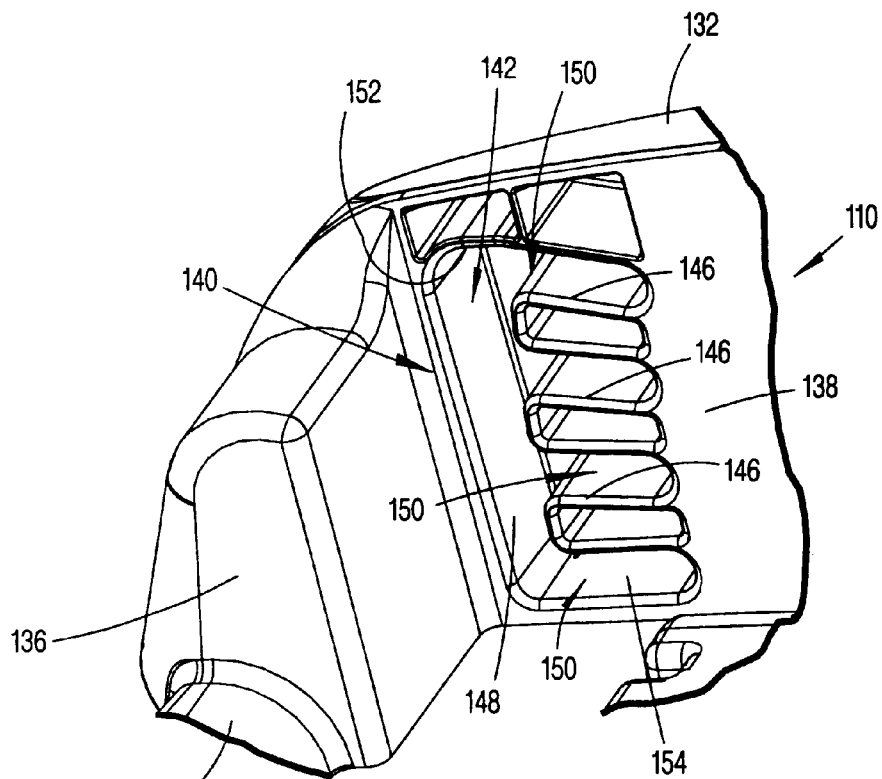
FIG. 7 is a perspective view, partially broken away, of the level adjuster receptor.
Figure 8:
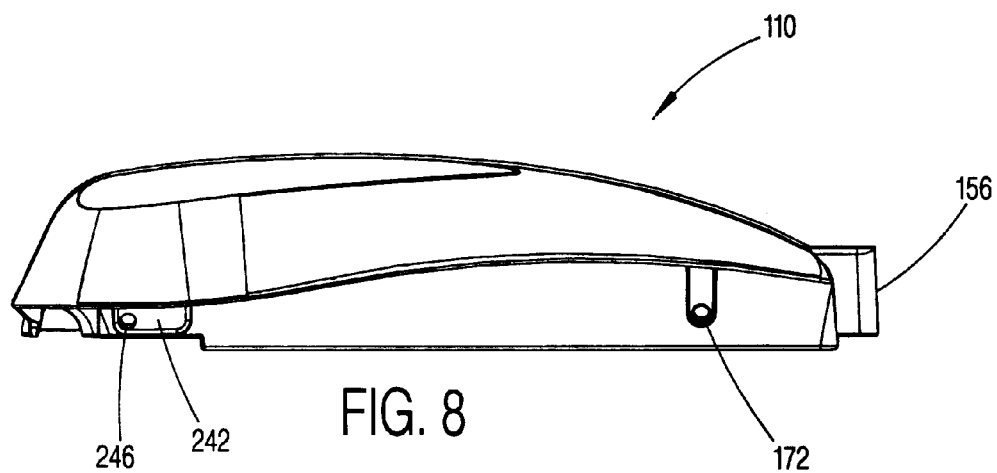
FIG. 8 is a side elevational view of the adjustable base.
Figure 9:
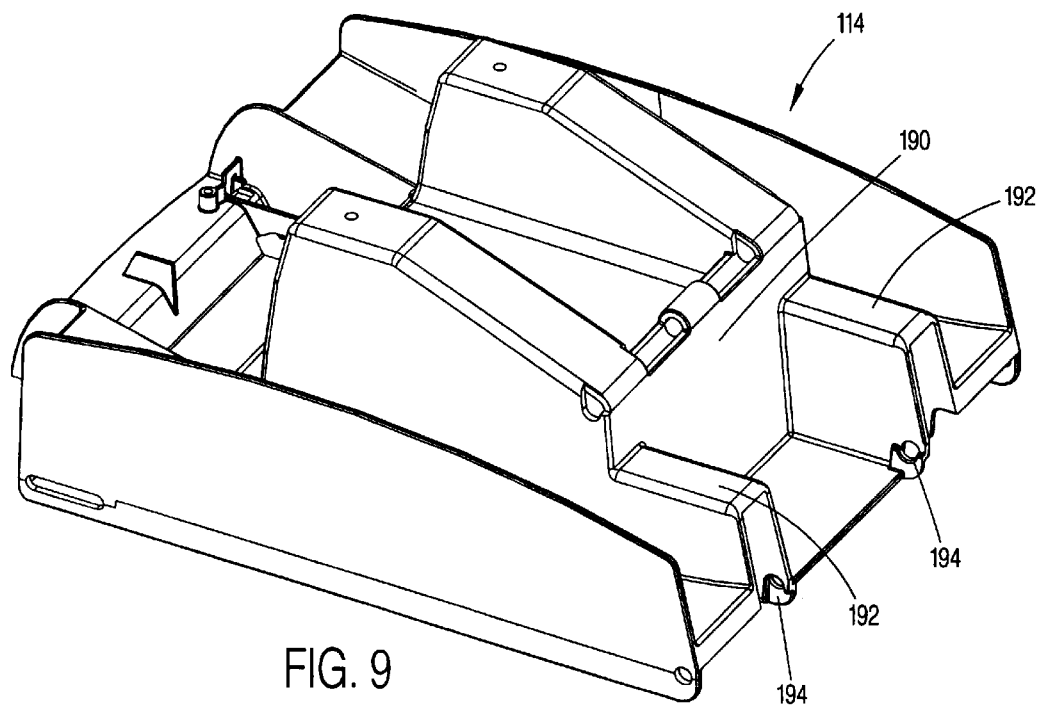
FIG. 9 is a rear perspective view of the recliner.
Figure 10:
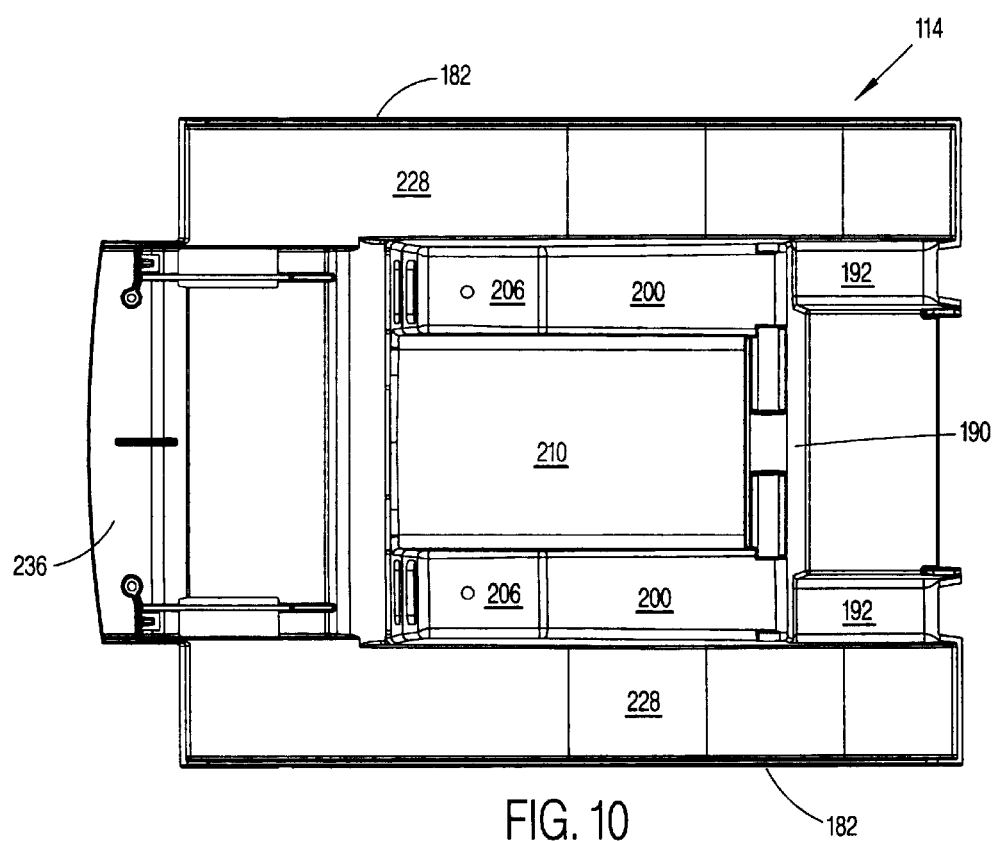
FIG. 10 is a top plan view of the recliner.

A level adjuster receptor 140 is proximally positioned near front cross bar 134 and is inset in each interior wall 138. As best seen in FIG. 7, level adjuster receptor 140 provides a multi-fingered cavity 142 which extends into side 132. A plurality of fingers 146 are directed along the length of side 132 within cavity 142. Three fingers 146 are shown and are provided with a slightly increasing angular orientation with respect to a bottom surface of side 132. Multi-fingered cavity 142 provides a channel 148 which is open and communicable with a plurality of level adjust openings or retention slots 150 formed between each adjacent finger 146. A top cavity wall 152 and a bottom cavity wall 154 are directed in the same direction as fingers 146 and provide additional retention slots 150. Thus, it will be appreciated that level adjuster receptor 140 provides at least four positional locations. It also will be appreciated that the opposed side 132 not shown has a similar construction for the level adjuster receptor 140 such that each finger 146 and cavity walls 152 and 154 provide a corresponding angular retention slot 150.

Adjustable base 110 also provides a rear cross bar 156 to interconnect sides 132 opposite front cross bar 134. Disposed between sides 132 and connected to rear cross bar 156 is a recliner pivot module 160.

Figure 5:
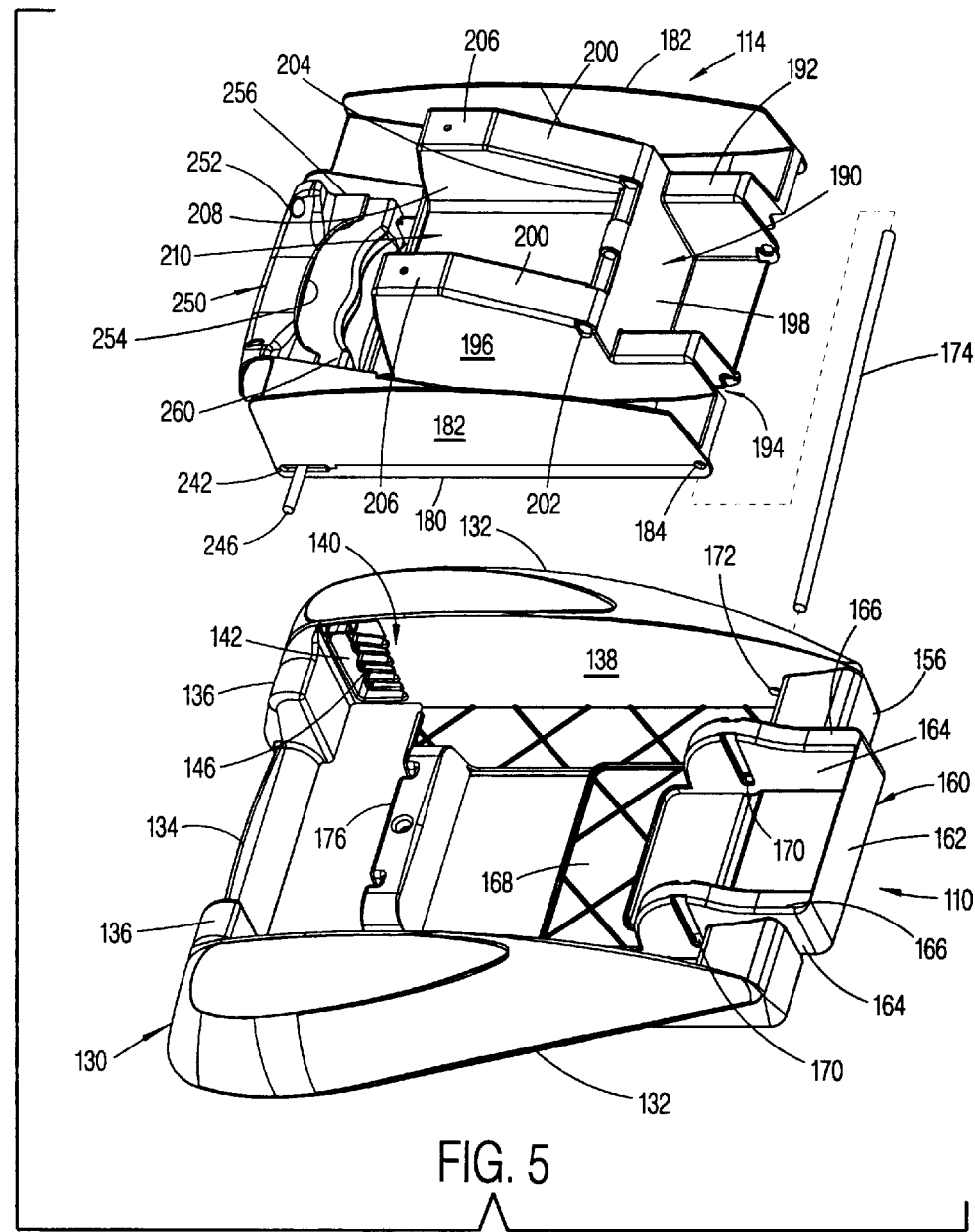
FIG. 5 is a perspective assembly drawing showing a recliner and an adjustable base.

Recliner pivot module 160, as best seen in FIG. 5, includes a plate 162 from which extends a pair of arms 166 having a somewhat curvilinear shape. Each arm 166 provides an edge 164 that extends down to a floor 168 which is supported by the automobile seat (not shown). Floor 168 extends between interior walls 138 and provides additional structural stability to base 110. Floor 168 also extends along the length of interior wall 138 without extending past level adjuster receptor 140. Each arm 166 provides an arm hole 170 aligned with the other. Each side 132 provides a side hole 172 proximal rear cross bar 156. A pivot rod 174, as best seen in FIG. 5, is received through arm holes 170 and side holes 172 to interconnect recliner 114 within adjustable base 110. A bar 176 connects sides 138 via floor 168 proximal front cross bar 134.

Recliner 114, as best seen in FIGS. 5, 6 and 9–12, includes a bottom 180 from which upwardly extends a pair of side walls 182. Bottom 180 and side walls 182 are sized to slidably fit between interior walls 138 as best seen in FIG. 5. Bottom 180 provides a pivot hole 184 alignable with arm holes 170 and side holes 172 to receive pivot rod 174. Accordingly, recliner 114 pivots within base 110 about pivot rod 174.

A seat pivot module 190 extends upwardly from bottom 180. Seat pivot module 190 includes a pair of side-by-side steps 192, each of which has an arm opening 194. Accordingly, when recliner 114 is mated with base 110, step 192 is aligned and covers a corresponding arm 166. Seat pivot module 190 includes a modular wall 196 which is substantially parallel with and faces an adjacent side wall 182. A hinge wall 198 interconnects each modular wall 196. Extending from hinge wall 198 and adjacent each modular wall 196 is a ramp surface 200. At the intersection of each ramp surface 200 and hinge wall 198 is a hinge hole 202. Notches 204 are provided at hinge wall 198. A flat surface 206 extends from ramp surface 200. An inner wall 208 extends downwardly from ramp surface 200 and flat surface 206 and forms a groove 210 therebetween. Groove 210 receives a portion of an underside of the car seat 102 as seen in FIG. 4.

Figure 6:
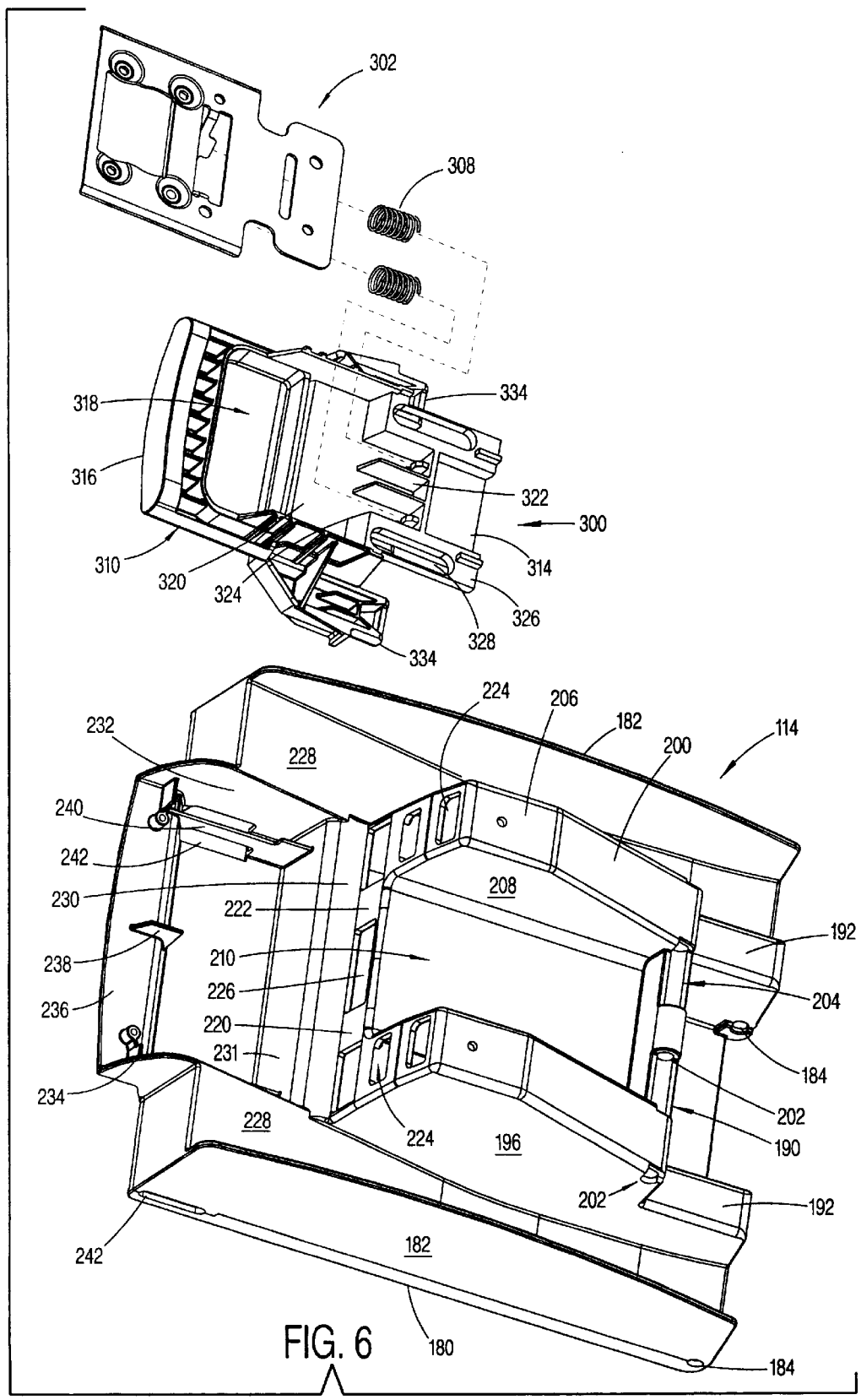
FIG. 6 is a perspective assembly drawing showing the recliner and a seat recline adjuster mechanism which is secured to an underside of the child car seat.
Figure 11:
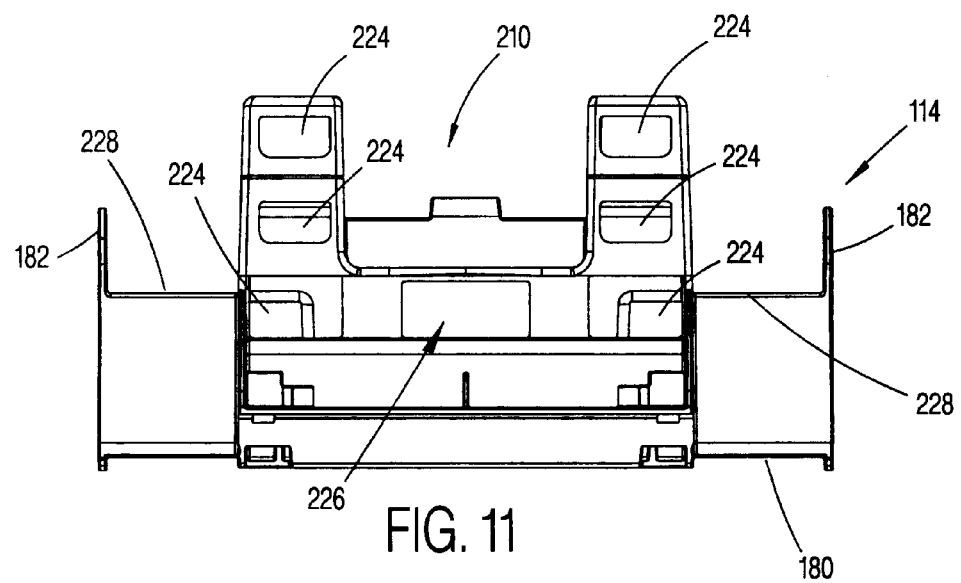
FIG. 11 is a front elevational view of the recliner.
Figure 12:
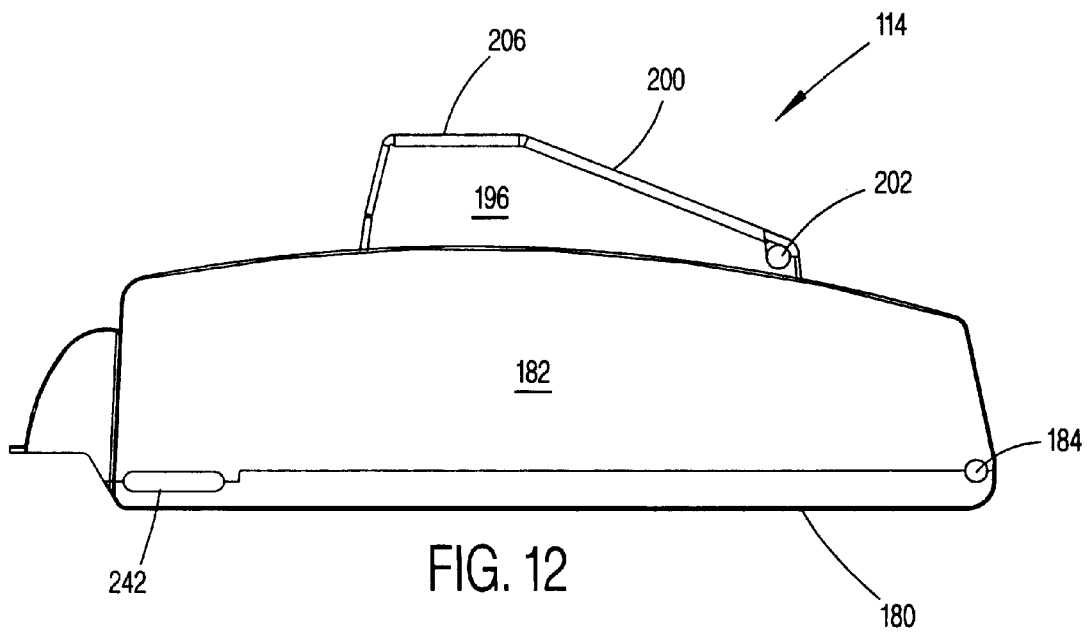
FIG. 12 is a side elevational view of the recliner.
Figure 13:
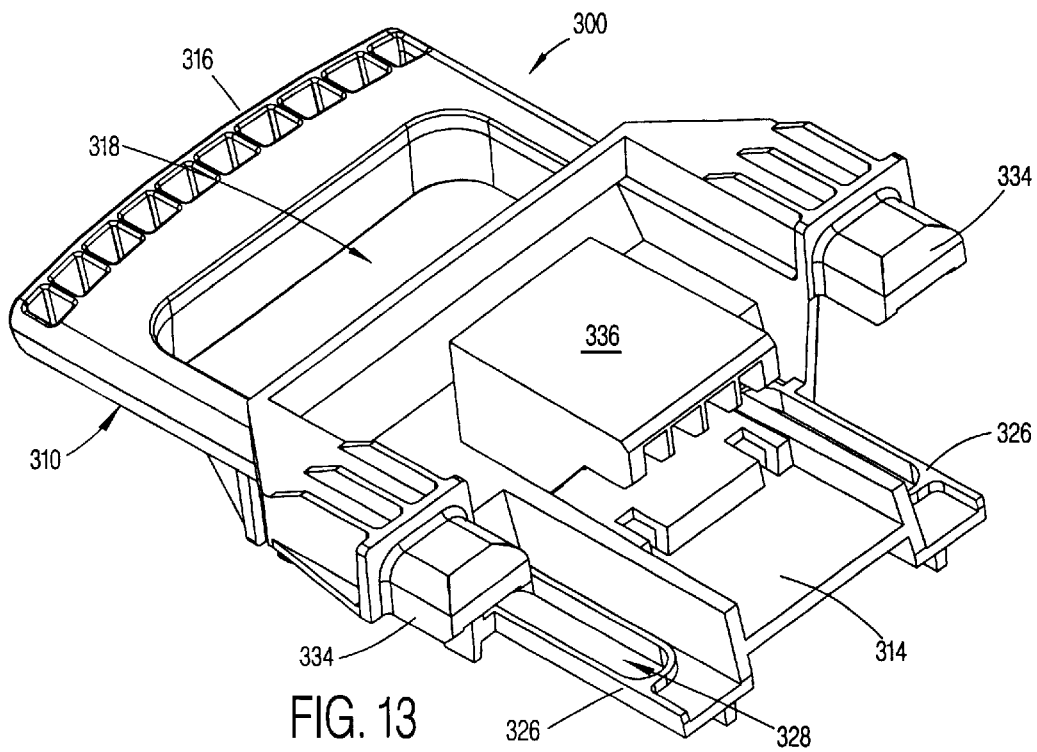
FIG. 13 is a bottom perspective view of the seat recline adjuster.
Figure 14:
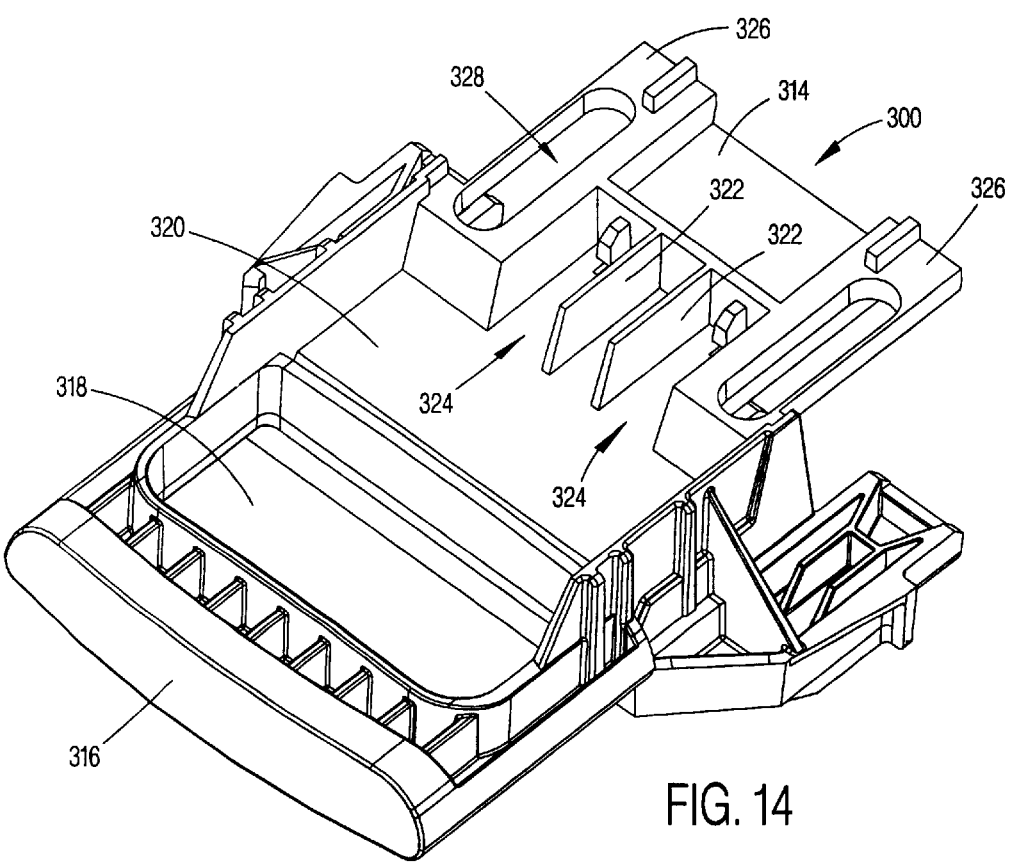
FIG. 14 is a top perspective view of the seat recline adjuster.
Figure 15:
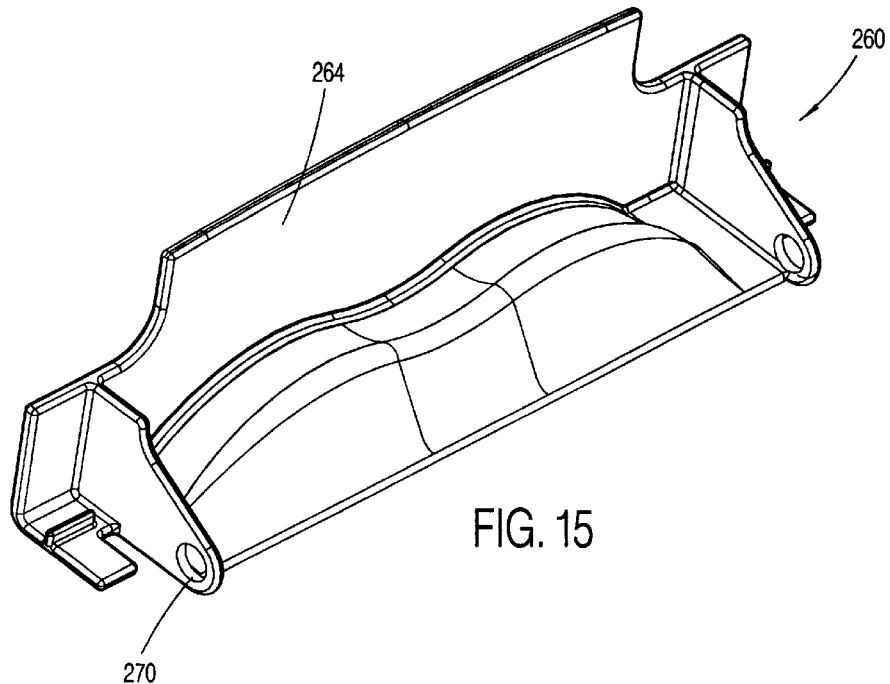
FIG. 15 is a bottom perspective view of a lever used in the level adjuster.
Figure 16:
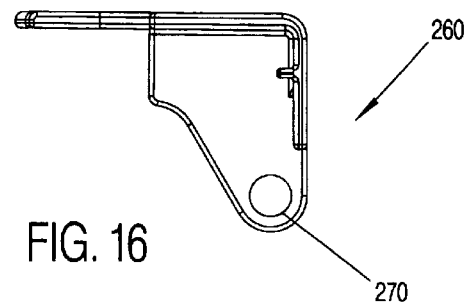
FIG. 16 is a side elevational view of the lever.
Figure 17:
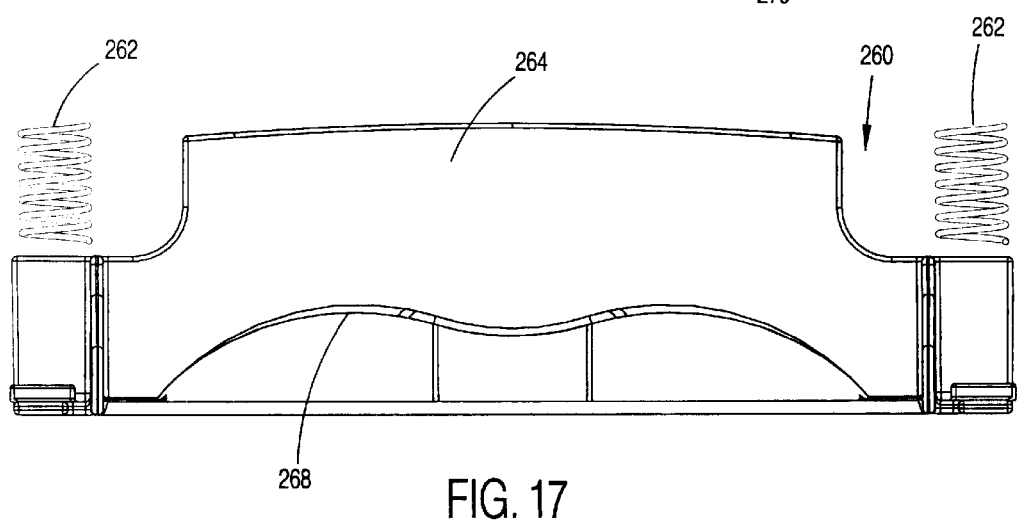
FIG. 17 is a top plan view of the lever.
Figure 18:
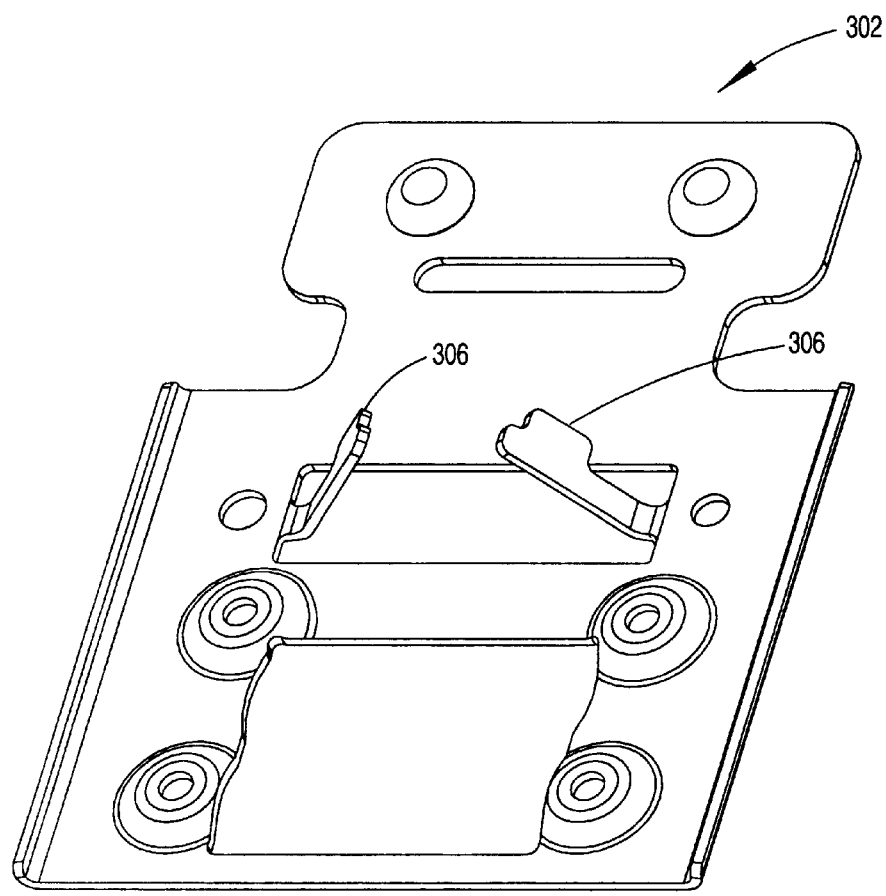
FIG. 18 is a bottom perspective view of a mounting bracket attached to an underside of the child car seat.
Figure 19:
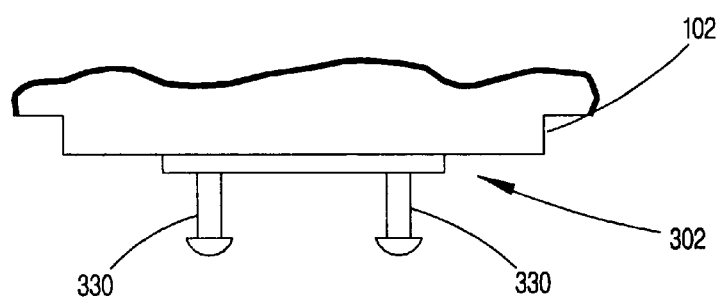
FIG. 19 is a schematic view of the mounting bolts and mounting bracket between which the seat recline adjuster is slidably mounted.

A seat recline level adjuster receptor 220 is provided by recliner 114 as best seen in FIGS. 6 and 11. Seat recline level adjuster receptor 220 includes a recline face 222 which extends downwardly from flats 206 and between modular walls 196 and inner walls 208. A plurality of paired recline adjustment openings 224 are provided by recline face 222. Provided between the lowermost recline adjustment openings 224 is a stub opening 226.

A pivot surface 228 is provided between corresponding sides 182 and modular walls 196. Pivot surface 228 is somewhat concave and supports corresponding pivot ribs 122 provided by child seat 102. A ledge 230 is provided substantially perpendicular to recline face 222 and an adjuster face 231 is provided substantially perpendicular to ledge 230. Ledge 230 and face 231 fit over bar 176 when recliner 114 is in its lowermost position on base 110. A pair of opposed handle walls 232 extend from face 231 and from corresponding pivot surfaces 228. A rim 234 juts out and extends from handle walls 232 wherein a handle brace 236 interconnects each rim 234. A nub 238 projects upwardly from about a center position of the brace 236. A pair of brackets extend between rim 234 and face 231. Extending through each bracket 240, each handle wall 232, and side walls 182 is a recliner slot 242 which slidably receives an adjuster pin 246 as best seen in FIG. 5.

A level adjuster 250, which is best seen in FIGS. 5 and 15–17, includes a shield 252 which is secured to rim 234. Shield 252 includes a contour portion 254 with outwardly extending tabs 256. A spring-biased lever 260 is coupled to shield 252. A pair of springs 262 are positioned on each end of lever 260. A slide piece 264 extends from lever 260 and is slidably received under contour portion 254 when a compressive force is applied to lever 260. A finger grip 268 is provided from slide piece 264. A pair of aligned pin holes 270 are provided in a gusset extending between each end of slide piece 264 and grip 268. Pin holes 270 are alignable with recliner slot 242.

From the foregoing description of the level adjuster 250 and as seen in the accompanying drawings, an individual may adjust the positional level of base 110. In a normal resting position, adjuster pin 246 is spring-biased into any one of retention slots 150. When it is desired to adjust the recline of the seat 102 with respect to the base 110 and the automobile car seat, the user grasps finger grip 268 and compresses springs 262 toward shield 252. This causes slide piece 264 to slide under contour portion 254 while simultaneously withdrawing adjuster pin 246 from one of adjust openings or retention slots 150. Once adjuster pin 246 is received in channel 148, the individual may raise or lower recliner 114 so that base 110 and recliner 114 conforms to the incline of the vehicle car seat. In essence, this places recliner 114 in a level position. This is advantageous when the child car seat 102 is placed in a rearward position. Of course, similar adjustments may be made when car seat 102 is in a forward-facing position.

A seat recline adjuster 300, which is best seen in FIGS. 6, 13–14, and 18–19 includes a mounting bracket 302 which is attached to an underside of car seat 102. Mounting bracket 302 includes a pair of holders 306. A spring 308 is associated with each holder 306 for biasing a recline handle 310. Recline handle 310 is slidably supported on the underside of car seat 102 by a pair of mount bolts 330. Recline handle 310 includes a frame 314 from which extends a grip 316 which forms a grip opening 318. A retention plate 320 is integral with frame 314 and provides a plurality of slats 322 which form spring channels 324. Spring channels 324 receive corresponding springs 308 and accordingly, recline handle 310 is biased with respect to mounting bracket 302. A pair of mount plates 326 integrally extend from retention plate 320 and frame 314 and provide a pair of mount slots 328 which slidably receive mount bolts 330. A pair of wings 334 project from each side of retention plate 320 and are directed toward frame 314 and away from grip 316. A stub 336 projects from retention plate 320 in the same direction as wings 334.

In the preferred method of use, an individual initially reclines seat 102 to the desired recline position by operating seat recline adjuster 300. This is accomplished by the user grasping grip 316 and disengaging wings 334 from respective pairs of recline adjustment openings 224 and, if appropriate, stub 336 from stub opening 226. Thus, it will be appreciated that mount slots 328 travel along mount bolts 330 as springs 308 are compressed. Once wings 334 are clear from seat recline adjuster receptor 220 and in particular recline face 222, the individual may raise or lower car seat 102 with respect to recliner 114. Of course, seat 102 and pivot ribs 22 "rock" on pivot surfaces 228 while pivoting on pivot rod 174. Once the desired recline position is obtained, the individual releases the recline handle 310 and the projecting wings 334 enter the appropriate recline adjustment openings 224.

Once the desired recline position is obtained, level adjuster 250 is manipulated in the manner described above to level car seat 102 relative to the vehicle seat and adjustable base 110. Accordingly, the level adjust and incline adjustment of child car seat 100 is complete and only need be adjusted when seat 100 is placed in a different automobile car seat or when the seat is changed between a rearward-facing position and a forward-facing position.

From the foregoing, it can be seen that the seat recline adjuster 300 allows positioning of seat 102 with respect to the adjustable base 110. Once this is accomplished, the individual may adjust the recliner 114 within adjustable base 110 by actuating level adjuster 250. This optimizes the safety and comfort of the infant carried by the child car seat.

In view of the foregoing, it should thus be evident that an adjustable base for a child car seat described herein accomplishes the objects of the present invention and otherwise substantially improves the art.

What is claimed is:

1. An adjustable child car seat, comprising a base having a pivot rod at one end and a level adjuster receptor which has a plurality of adjust positions at an opposite end; a recliner carried by said base and coupled to said pivot rod at one end, said recliner having a level adjuster at an opposite end, said level adjuster selectively moveable into one of said plurality of adjust positions, said recliner having a seat recline adjuster receptor with a plurality of recline positions and a seat pin; and a car seat pivotably mounted to said seat pin, said car seat having a seat recline adjuster selectively moveable into one of said plurality of recline positions.

2. The adjustable child car seat according to claim 1, wherein said base further comprises a recliner pivot module through which said pivot rod extends, said recliner pivot module having a pair of upwardly extending arms that are engaged by said recliner.

3. The adjustable child car seat according to claim 2, wherein said base comprises a frame with opposed sides with said level adjuster receptor therein, each said level adjuster receptor having a cavity with a plurality of fingers extending in a direction away from said pivot rod, said plurality of fingers forming a plurality of retention slots for selectively receiving said level adjuster.

4. The adjustable child car seat according to claim 3, wherein said level adjuster comprises a spring-biased lever having a pin-hole therethrough for carrying a pivot pin, said pivot pin moveable between said retention slots.

5. The adjustable child car seat according to claim 2, wherein said recliner further comprises a pair of side walls extending from a base, a seat pivot module having modular walls, said modular walls and said side walls forming a pair of pivot surfaces therebetween for supporting said car seat, one end of said seat pivot module carrying said seat pin, an opposite end of said car seat module having a plurality of recline adjustment openings therethrough.

6. The adjustable child car seat according to claim 5, wherein said seat recline adjuster comprises a bracket attached to a bottom of said car seat, and a recline handle slidably carried by said car seat bottom, said recline handle spring biased by said bracket, said recline handle having at least one projection selectively receivable in one of said plurality of recline adjustment openings.

7. The adjustable child car seat according to claim 6, wherein said car seat has a pair of pivot ribs received on respective pivot surfaces.

8. The adjustable child car seat according to claim 1, wherein said car seat has a pair of slots therethrough, one of said slots receiving a car seat belt when the seat is forward facing and the other of said slots receiving a car seat belt when the seat is rearward facing.

9. An adjustable child car seat, comprising a base having opposed sides connected by a front cross bar at one end and a rear cross bar at an opposite end, said opposed sides having a pair of side holes aligned with one another proximal said rear cross bar, each of said sides having a level adjuster receptor facing one another proximal said front cross bar, said level adjuster receptor having a plurality of level positions;

a recliner having a bottom with opposed side walls slidably adjacent and disposed between said opposed sides, said bottom having a pivot hole aligned with said side holes to receive a pivot rod, said recliner pivotable about said pivot rod, said recliner having a seat pivot module substantially medially disposed between said side walls, and said seat pivot module having a hinge hole proximal said pivot rod and a seat recline adjuster receptor with a plurality of adjustment openings distal said pivot rod, said recliner having a pivot surface beside said side walls adjacent said seat pivot module, said bottom further having a rim extending between said opposed side walls, said bottom having a recliner slot therethrough;

a level adjuster secured to said rim, said level adjuster carrying a spring-biased adjuster pin which is movable within said recliner slot and selectively moveable between said plurality of level positions;

a car seat having a pair of pivot ribs slidably movable on respective said pivot surfaces, said pivot ribs having aligned pivot holes therethrough that are alignable with said hinge hole, wherein said pivot holes and said hinge hole receive a seat pin to allow said car seat to move with respect to said recliner; and a seat recline adjuster biasingly mounted to an underside of said car seat, said seat recline adjuster having at least one projection that is selectively movable between said plurality of adjustment openings to allow adjustment of said car seat with respect to said recliner and wherein said recliner is adjustable with respect to said base.

10. The adjustable child car seat according to claim 9, wherein said base has a recliner pivot module extending from said rear cross bar, said recliner pivot module having a pair of upwardly extending arms each having an aligned arm hole therethrough, said arm holes receiving said pivot rod, said recliner having a pair of open steps extending between said seat pivot module and said bottom, said open steps slidably positionable over said arms.

11. The adjustable child car seat according to claim 9, wherein said level adjuster receptor comprises a multi-fingered cavity inset into each said side, said cavity having a plurality of fingers extending in a direction toward said level adjuster, said fingers forming retention slots therebetween to receive said adjuster pin and hold said recliner at a desired position.

12. The adjustable child car seat according to claim 11, wherein each said recliner slot is alignable with said retention slots.

13. The adjustable child car seat according to claim 9, wherein said seat pivot module has a pair of ramps extending upwardly from a hinge wall through which said hinge hole extends, said ramps forming a recline face opposite said hinge wall, said recline face providing said pairs of adjustment openings.

14. The adjustable child car seat according to claim 13, wherein said seat recline adjuster comprises a mounting bracket secured to an underside of said car seat; at least one mounting bolt extending from said underside; and a recline handle having a slot slidably secured to said mounting bolt, said recline handle spring biased against said mounting bracket, said recline handle having a pair of projecting wings receivable in corresponding pairs of adjustment openings.

* * * * *